United States Patent [19]

Proksa et al.

[11] 4,389,375

[45] Jun. 21, 1983

[54] APPARATUS FOR PRODUCING A REACTION MIXTURE OF FLUID COMPONENTS FORMING A FOAM OR SOLID MATERIAL

[75] Inventors: Ferdinand Proksa, Leverkusen; Hans-Michael Sulzbach, Königswinter; Reiner Raffel, Siegburg; Ferdinand Althausen, Neunkirchen-Seelscheid, all of Fed. Rep. of Germany

[73] Assignee: Maschinenfabrik Hennecke GmbH, Leverkusen, Fed. Rep. of Germany

[21] Appl. No.: 262,017

[22] Filed: May 11, 1981

[30] Foreign Application Priority Data

May 28, 1980 [DE] Fed. Rep. of Germany ....... 3020203

[51] Int. Cl.³ ............................................. B01J 14/00
[52] U.S. Cl. .................................. 422/111; 366/137; 366/159; 366/173; 422/133
[58] Field of Search ............... 422/131, 133, 111, 112; 366/137, 151, 152, 159, 173, 176, 182; 137/625.4

[56] References Cited

U.S. PATENT DOCUMENTS

| 4,115,066 | 9/1978 | Muhle | 422/133 |
| 4,193,701 | 3/1980 | Koch et al. | 366/159 |
| 4,239,732 | 12/1980 | Schneider | 422/133 |

FOREIGN PATENT DOCUMENTS 2855916 7/1980 Fed. Rep. of Germany .

*Primary Examiner*—Michael S. Marcus
*Attorney, Agent, or Firm*—Gene Harsh; Joseph C. Gil; Richard A. Elder

[57] ABSTRACT

Hydraulically coupled injection nozzles (5,28) and return nozzles (15,38) are used in an apparatus for producing a reaction mixture of fluid components forming foam or a solid material. These nozzles (5,15,28,38) comprise control pins (11,20,34,43) which are designed to be inserted into the openings (6,17,29,40) of the nozzles (5,15,28,38). The ratio between the distances which the control pins (11,20,34,43) travel outside and inside the orifices (6,17,29,40) is adjusted in such a way that, when the nozzles (5,15,28,38) are switched from "mixing" to "circulation" or vice versa, there is a time interval during which all the nozzles (5,15,28,38) are closed.

4 Claims, 1 Drawing Figure

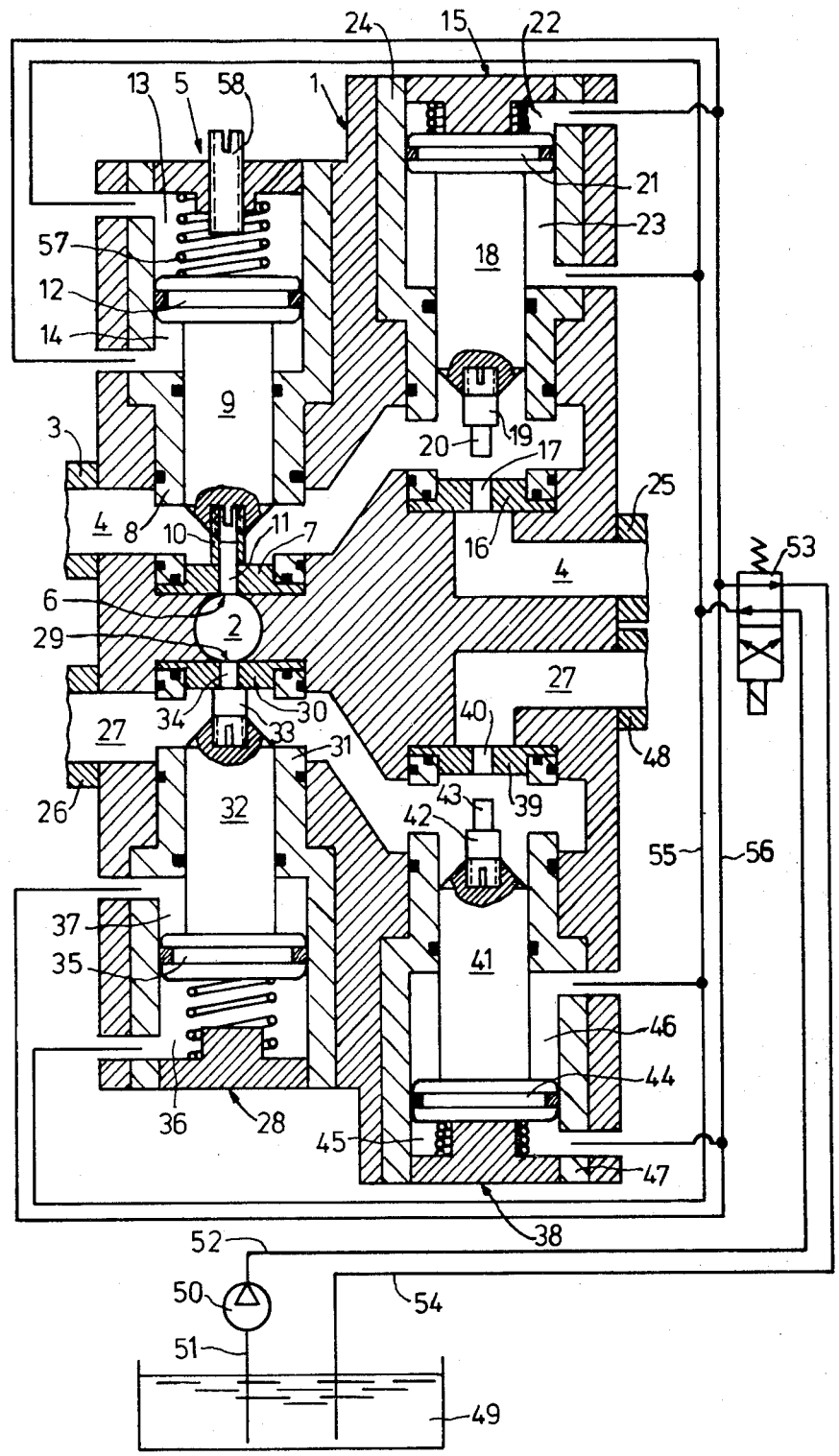

APPARATUS FOR PRODUCING A REACTION MIXTURE OF FLUID COMPONENTS FORMING A FOAM OR SOLID MATERIAL

BACKGROUND OF THE INVENTION

German Offenlegungsschrift 2,855,916 describes an apparatus for producing a reaction mixture from fluid components to form a solid or foam material. The apparatus broadly consists of (a) storage vessels for the components,
(b) feed pipes which connect the storage vessels via
(c) metering pumps to a
(d) mixing chamber arranged in a mixing head into which said feed pipes open via
(e) injectors;
(f) an outlet opening arranged in the mixing chamber,
(g) return pipes with associated shut-off members,
(h) the injectors and the shut-off members being in the form of needle-equipped nozzles which
(j) cooperate with replaceable nozzle seats containing the nozzle orifices;
(k) a separate hydraulic positive control being associated with each nozzle, and
(l) all the nozzles being closed for a short time interval during the changeover from mixing condition to fluid circulation condition and from fluid circulation condition to mixing condition.

This apparatus has proved successful in principle. However, it has an extremely complicated structure because the hydraulic control system has to have two control valves which are designed to be switched through a timing element.

An object of the present invention is to provide an apparatus of the kind mentioned above in which the hydraulic control system is simpler and, hence, less expensive and more reliable in operation.

BRIEF DESCRIPTION OF THE DRAWING

FIG. 1 Schematic of the mixhead of the new apparatus.

DESCRIPTION OF THE INVENTION

According to the present invention, there is provided an apparatus for producing a reaction mixture of fluid components forming a solid or foam material and optionally containing filler, the apparatus comprising: storage vessels for the components; feed pipes which connect the storage vessels via metering pumps to a mixing chamber arranged in a mixhead into which said feed pipes open via injectors; an outlet opening arranged in the mixing chamber; and return pipes with associated shut-off members, the injectors and the shut-off members being in the form of nozzles comprising needles which cooperate with replaceable nozzle seats containing the nozzle orifices; a separate hydraulic positive control being associated with each nozzle, and all the nozzles being closed for a short time interval during the changeover from mixing condition to fluid circulation condition and from fluid circulation condition to a mixing condition, wherein the needles of the nozzles comprise control pins which are designed to be sealingly inserted into the nozzle orifices, the distances which the control pins travel inside the nozzle orifices and greater than outside, and the nozzles are designed to be simultaneously operated.

More particularly, the present invention relates to an apparatus for producing a reaction mixture from fluid components comprising:

(a) storage vessels for the components,
(b) feed pipes leading from said storage vessels via metering pumps to a passage in a mixhead,
(c) said passage having two outlets, one of said outlets leading to a mixing chamber, the other of said outlets leading via return pipes back to said storage vessels,
(d) each of said outlets being in the form of a nozzle orifice, and having associated therewith a hydraulically controlled pin adapted to be sealingly inserted into the orifice, the distance which said control pin travels inside said orifice being greater than the distance which said control pin travels outside said orifice, and
(e) wherein said control pins are designed to be simultaneously operated.

This embodiment enables all the injectors and shut-off members to be controlled by a single common control valve without any need for a timing element.

In one particular embodiment of the apparatus, the ratio between the distances which the control pins travel inside and outside the nozzle orifices is adjustable. As a result, the required time interval during which all the nozzles are closed may be exactly preselected for each particular application taking into account the speeds of travel of the nozzle needles. During the changeover, the control pins of the closing nozzles penetrate into the openings of the nozzle seats, fractions of a second earlier than the control pins of the opening nozzles withdraw completely from the associated openings.

In another particular embodiment, the control pins are replaceable. As a result, it is possible to use control pins of different length so that the abovementioned ratio between the degrees of travel may be selected while, on the other hand, the control pins may readily be replaced as expendable components.

In another embodiment, the length of the control pins is adjustable. As a result, it is possible to continuously adjust the ratio between the degrees of travel. As a result of the wear which they undergo, it is preferred that these adjustable control pins be replaceable.

One example of an embodiment of the mixhead of the new apparatus is diagrammatically illustrated in section in the accompanying drawing and described in detail in the following.

The mixhead consists of a housing 1 which surrounds a mixing chamber 2. A pipe 3 leads from a storage vessel (not shown) for isocyanate via a metering pump (not shown) to the housing 1 of the mixhead and opens into a passage 4 in which an injection nozzle 5 is arranged. The injection opening 6 of this injection nozzle 5 which faces the mixing chamber 2 is provided in a replaceable nozzle seat 7 resembling a perforated disc. A nozzle needle 9 is guided in an insert 8. It comprises a head 10 with a control pin 11. The head 10, which is designed to be screwed in, is in the form of a collet and, in this way, enables the length of that part of the control pin 11 guided therein which projects from the head 10 to be adjusted. In the drawing, the control pin 11 is in the position in which it closes the injection opening 6. The rear end of the nozzle needle 9 is in the form of a hydraulic piston 12 with which the hydraulic chambers 13,14 provided in the insert 8 are associated. In addition, the passage 4 is designed to be interrupted by a return nozzle 15 which is shown in the open position in the drawing. This nozzle 15 is structurally identical with the injection nozzle 5, consisting of a seat 16 with the injection opening 17, the nozzle needle 18 with a collet-like head 19 which is designed to be screwed in and in which a control pin 20 is guided and of hydraulic pistons 21 and associated hydraulic chambers 22,23 in the insert 24. Finally, the passage 4 opens into a return pipe 25 which leads back to the storage vessel.

From a storage vessel (not shown) for polyol, a feed pipe 26 leads via a metering pump (not shown) to the housing 1 of the mixing head and opens into a passage 27 in which an injection nozzle 28 is arranged. The injection opening 29 of this injection nozzle 28 which faces the mixing chamber 2 is provided in a replaceable nozzle seat 30 resembling a perforated disc. A nozzle needle 32 around which liquid may circulate is guided in an insert 31. It comprises a head 33 with a control pin 34. The head 33, which is designed to be screwed in, is in the form of a collet and, in this way, enables the length of that part of the control pin 34 guided therein which projects from the head 33 to be adjusted. In the drawing, the control pin 34 is shown in the position in which it closes the injection opening 29. The rear end of the nozzle needle 32 is in the form of a hydraulic piston 35 with which the hydraulic chambers 36,37 provided in the insert 31 are associated. In addition, the passage 27 is designed to be interrupted by a return nozzle 38 which is shown in the open position. The nozzle 38 is structurally identical with the nozzles 5, 15 and 28, comprising a seat 39 with the injection opening 40, the nozzle needle 41 with the collet-like head 42 which is designed to be screwed in and in which a control pin 43 is guided and of hydraulic pistons 44 and associated hydraulic chambers 45,46 in the insert 47. Finally, the passage 27 opens into a return pipe 48 which leads back to the storage vessel.

The hydraulic fluid is designed to be pumped (pump 50) from a reservoir 49 via a dip pipe 51 into a feed pipe 52 which terminates at the reversing element 53. This reversing element is additionally connected to a return pipe 54 which leads back to the reservoir 49. The reversing element 53 is connected by a branching pipe 55 to the hydraulic chambers 13, 23, 36, 46 and by a branching pipe 56 to the hydraulic chambers 14, 22, 37, 45. The springs 57 keep the nozzles 5, 15, 28, 38 closed by applying gentle pressure when the apparatus is out of operation. This is their sole function. In conjunction with the replaceable control pin 11, an adjustable stop screw 58 (shown only in the case of nozzle 5) provides for the adjustability of the ratio between the degrees of travel of the control pin 11 inside and outside the orifice 6.

What is claimed is:

1. An apparatus for producing a reaction mixture of fluid components forming a solid or foam material and optionally containing filler, the apparatus comprising: storage vessels for the components, feed pipes which connect the storage vessels via metering pumps to a mixing chamber arranged in a mixing head into which said feed pipes open via injectors; an outlet opening arranged in the mixing chamber; and return pipes with associated shut-off members; the injectors and the shut-off members being in the form of nozzles comprising needles which cooperate with replaceable nozzle seats containing the nozzle orifices; a separate hydraulic positive control piston and chamber being associated with each nozzle, control means, associated with each of said pistons and chambers, adapted to provide that all the nozzles are closed for a short time interval during the changeover from mixing condition to fluid circulation condition and from fluid circulation condition to a mixing condition, wherein the needles of the nozzles comprise control pins which are designed to sealingly engage the nozzle orifices, the control pins never traveling more than a distance equal to the length of the nozzle orifices back from the nozzle orifices when the nozzles are open, and the nozzles are designed to be simultaneously operated.

2. An apparatus as claimed in claim 1, wherein the ratio between the distances which the control pins travel outside and inside the nozzle orifices is adjustable.

3. An apparatus as claimed in claim 1, wherein the control pins are replaceable.

4. An apparatus as claimed in claim 1, wherein the length of the control pins is adjustable.

* * * * *